United States Patent
Kuzma

Patent Number: 5,729,684
Date of Patent: Mar. 17, 1998

[54] METHOD AND APPARATUS FOR HETEROGENEOUS MULTIMEDIA CONFERENCING USING MULTIPOINT REFERENCES

[75] Inventor: Andrew Kuzma, Portland, Oreg.

[73] Assignee: Intel Corporation, Santa Clara, Calif.

[21] Appl. No.: 442,350

[22] Filed: May 16, 1995

[51] Int. Cl.$^6$ .................................................. G06F 11/00
[52] U.S. Cl. ......................................................... 395/200.34
[58] Field of Search ................................. 395/200.1, 154, 395/200.04, 200.34; 370/54, 62, 60

[56] References Cited

U.S. PATENT DOCUMENTS

| | | | |
|---|---|---|---|
| 4,949,169 | 8/1990 | Lumelsky et al. | 358/86 |
| 5,003,532 | 3/1991 | Ashida et al. | 370/62 |
| 5,014,267 | 5/1991 | Tompkins et al. | 370/62 |
| 5,103,444 | 4/1992 | Leung et al. | 370/60 |
| 5,109,384 | 4/1992 | Tseung | 371/32 |
| 5,138,614 | 8/1992 | Baumgartner et al. | 370/62 |
| 5,179,550 | 1/1993 | Simpson | 370/54 |
| 5,195,086 | 3/1993 | Baumgartner et al. | 370/62 |
| 5,206,934 | 4/1993 | Naef, III | 395/200.04 |
| 5,210,794 | 5/1993 | Brunsgard | 380/9 |
| 5,315,633 | 5/1994 | Champa | 348/16 |
| 5,373,549 | 12/1994 | Bates et al. | 379/93 |
| 5,384,776 | 1/1995 | Giullford et al. | 395/85.1 |
| 5,446,491 | 8/1995 | Shibata et al. | 348/15 |
| 5,491,797 | 2/1996 | Thompson et al. | 395/200.03 |
| 5,537,142 | 7/1996 | Fenovil | 348/12 |
| 5,570,363 | 10/1996 | Holm | 370/62 |
| 5,577,042 | 11/1996 | McGraw, Jr. et al. | 370/85.7 |
| 5,621,884 | 4/1997 | Beshears | 395/182.08 |

FOREIGN PATENT DOCUMENTS 9501024  1/1996  WIPO.

*Primary Examiner*—Ayaz R. Sheikh
*Attorney, Agent, or Firm*—Blakely, Sokoloff, Taylor & Zafman

[57] ABSTRACT

A plurality of specially equipped personal conference managers (PCMs), one each, are provided to a plurality of personal conference systems (PCSs), and a plurality of specially equipped multi-point conference managers (MCMs), also one each, are provided to a plurality of multi-point control units (MCUs) interconnecting the PCSs. Each PCM is equipped with a first plurality of data routing matrix management functions for creating, updating, and deleting a plurality of data routing matrices specifying a plurality of data routing patterns for the PCSs. The first plurality of data routing matrix management functions are also used for creating, updating, and deleting a plurality of data routing matrix employment rules specifying the conditions governing the runtime employment of the data routing matrices. The conditions are specified in terms of multi-point references. Additionally, each PCM as well as each MCM is equipped with a second plurality of data routing matrix management functions for enrolling these routing matrices and their employment rules with the MCMs, and canceling their enrollments. Furthermore, each PCM as well as each MCM is equipped with a data transmission function for sending data utilizing these data routing matrices and their employment rules.

27 Claims, 8 Drawing Sheets

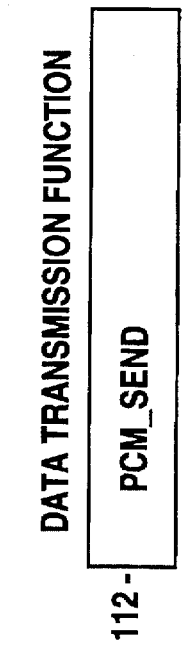
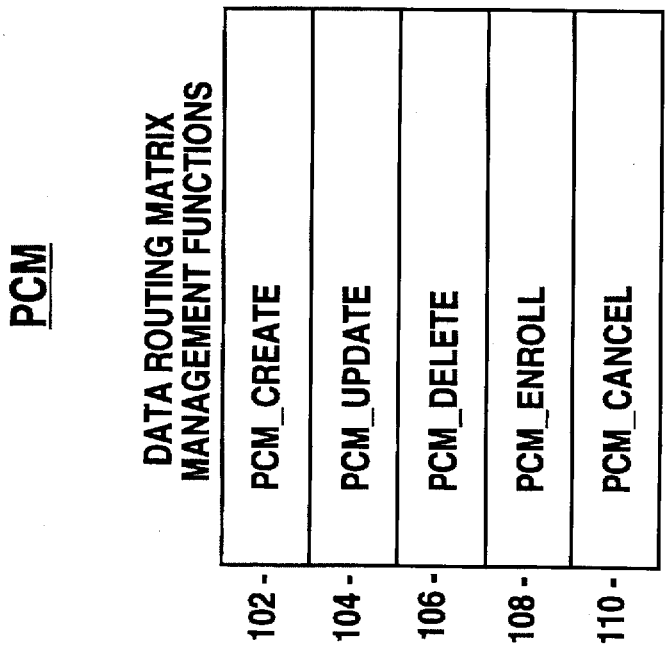
*Figure 7*
*Figure 6*

METHOD AND APPARATUS FOR HETEROGENEOUS MULTIMEDIA CONFERENCING USING MULTIPOINT REFERENCES

BACKGROUND OF THE INVENTION

1. Field of the Invention

The present invention relates to the fields of computer systems and computer conferencing. More specifically, the present invention relates to heterogeneous multimedia conferencing.

2. Background Information

Today, many computer conferencing systems support simultaneous exchanges of "natural" data (i.e. video, audio, etc.) as well as "conventional" data (i.e. file transfer, email, remote login, etc.) among the conference participants. Exchanges of these data are typically made in either an one-to-all or a selective point-to-point basis. In the case of one-to-all, data are broadcast to all participants, whereas in the case of point-to-point, data are sent to particularized recipients, one a time.

As telecommunication and computing continue to merge, both users and system integrators desire closer modeling of participant behaviors in a face-to-face conference. For example, in a face-to-face conference, in addition to the main conference, typically there are side conversations among some of the participants. As a further illustration, a listener of a presentation may ask another listener to clarify certain information that was just "broadcast" to the listeners by the presenter. Furthermore, there may be sub group discussions among subsets of the participants on the exchanges that are taking place in the main conference. The prior art approach of exchanging data has the disadvantage in that for a large conference, conducting these sub group discussions may require sending the subgroup discussion data along with the specific recipient's address, as many time as there are participants to receive it.

Thus, it is desirable if conference participants can engage in these side conversations or subgroup discussions in a more friendly and efficient manner. As will be described in more detail below, the method and apparatus of the present invention achieves these and other desirable results.

SUMMARY OF THE INVENTION

The desired results are advantageously achieved by providing a plurality of specially equipped personal conference managers (PCMs), one each, to a plurality of personal conference systems (PCSs), and a plurality of specially equipped multi-point conference managers (MCMs), also one each, to a plurality of multi-point control units (MCUs) interconnecting the PCSs.

Each PCM is equipped with a first plurality of data routing matrix management functions for creating, updating, and deleting a plurality of data routing matrices specifying a plurality of data routing patterns for the PCSs, thereby allowing a conference to be viewed as a collection of these data routing matrices, and data routing among the PCSs to be specified in a transport network independent manner. The first plurality of data routing matrix management functions are also used for creating, updating, and deleting a plurality of data routing matrix employment rules specifying the conditions governing the runtime employment of the data routing matrices, thereby allowing data routing to be dynamically altered during runtime in an efficient manner with very low switching latency. The conditions are specified in terms of multi-point references. In some embodiments, the multi-point references are implemented using character tokens, and the employment rules are expressed in terms of these character tokens.

Additionally, each PCM as well as each MCM is equipped with a second plurality of data routing matrix management functions for enrolling these routing matrices and their employment rules with the MCMs, and canceling their enrollments. Furthermore, each PCM as well as each MCM is equipped with a data transmission function for sending data. The PCM's data transmission functions specify the destinations in terms of the multi-point references. In some embodiments, the multi-point references are specified in the header of each data frame. The MCM's data transmission functions ascertain the destinations from the proper routing matrices as governed by the employment rules, and route the data accordingly. In some embodiments, for certain data types, the data transmission functions of the MCMs are further equipped to infer from the routing matrices whether certain intermediate processing are to be applied before routing the data, and cause the necessary processing to be performed.

Thus, by enrolling and canceling data routing matrices for audio/video data and their employment rules, a conference participant may engage in side conversations or subgroup discussions with selected subgroups of conference participants, without having to particularize the recipients of each data transmission, one at a time.

BRIEF DESCRIPTION OF DRAWINGS

The present invention will be described by way of exemplary embodiments, but not limitations, illustrated in the accompanying drawings in which like references denote similar elements, and in which:

FIGS. 6 & 7 illustrate one embodiment of the data routing matrix management functions and the data transmission functions of FIG. 5;

DETAILED DESCRIPTION OF THE INVENTION

In the following description, for purposes of explanation, specific numbers, materials and configurations are set forth in order to provide a thorough understanding of the present invention. However, it will be apparent to one skilled in the art that the present invention may be practiced without the specific details. In other instances, well known features are omitted or simplified in order not to obscure the present invention.

Figure 1:
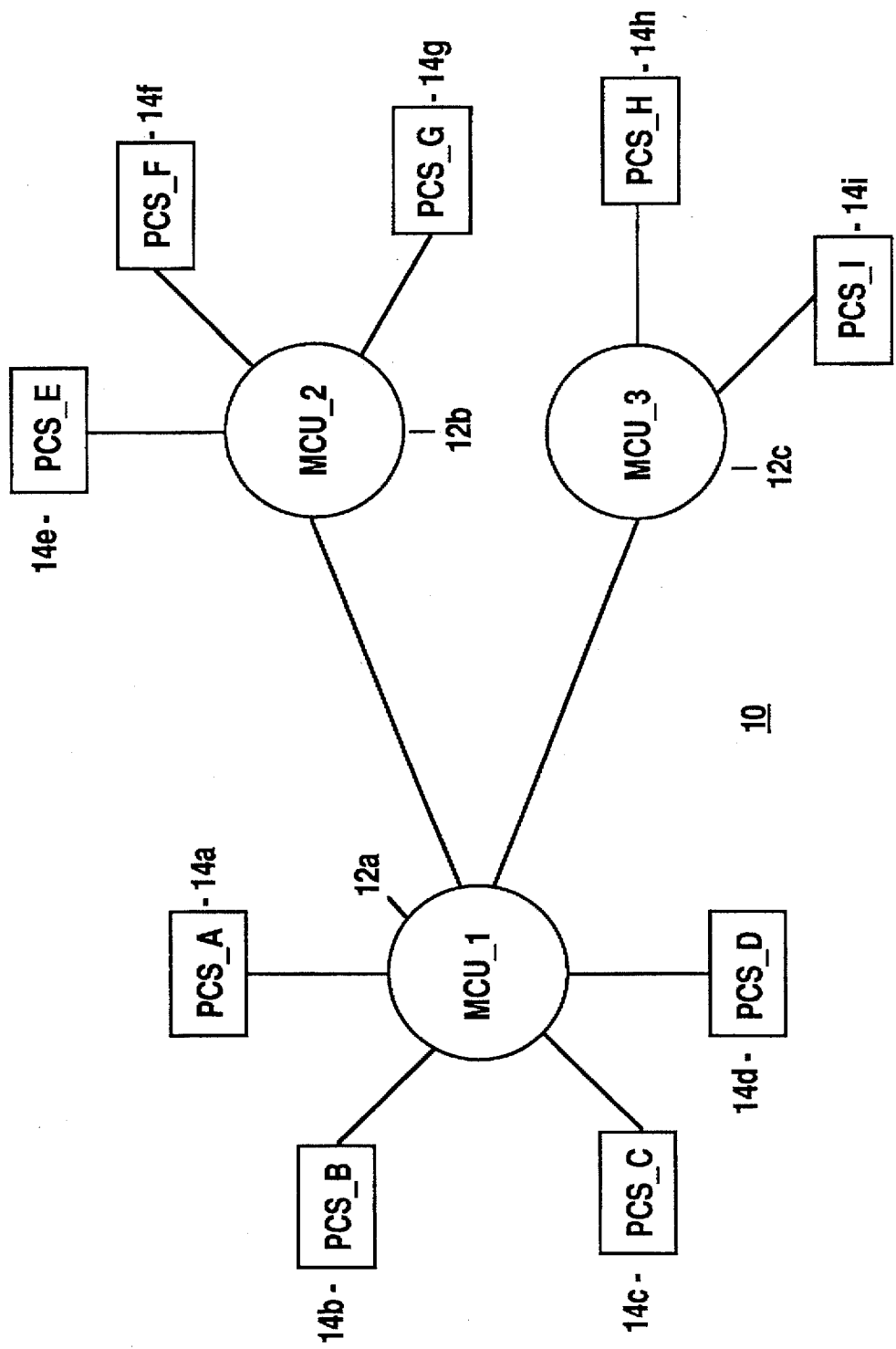
FIGS. 1 & 2 illustrate two exemplary networks of personal conferencing systems incorporating the teachings of the present invention.
Figure 2:
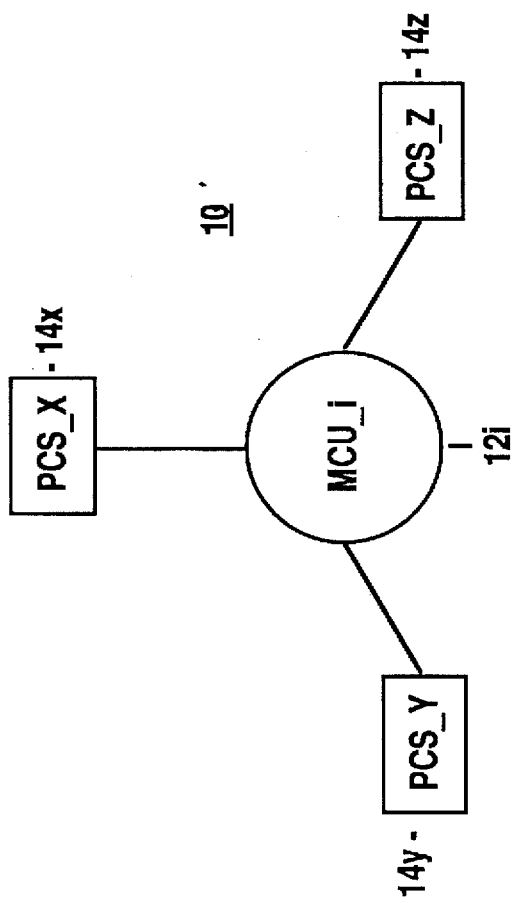

Referring now to FIGS. 1 & 2, wherein two exemplary networks of personal conferencing systems incorporated with the teachings of the present invention are illustrated. Exemplary network 10 comprises a plurality of personal conferencing systems (PCSs) 14a–14i and a plurality of multi-point control units (MCUs) 12a–12c. MCUs 12a–12c interconnect PCSs 14a–14i to each other. In some cases, the interconnections are made through another MCU 12a–2c. For example, MCU_1 12a interconnects PCS_A 14a to PCS_D 14d directly, but to PCS_H 14h indirectly through MCU_3 12c. Exemplary network 10' is a simpler network having only one MCU, i.e. MCU_i interconnecting all conference participants PCS_X, PCS_Y and PCS_Z 14x–14z to each other directly. The two exemplary networks 10 and 10' are intended to represent complex networks having multiple PCSs and MCUs, and simple networks having a small number of PCSs and a single MCU respectively. Furthermore, PCSs 14a–14i and 14x–14z need not be systems of like kind, provided they all employ communication software that are compatible with the communication software of the interconnecting MCUs 12a–12c and 12i. As will be obvious from the description to follow, the present invention may be practiced on networks of any complexity having any heterogeneous mix of PCSs.

Figure 3:
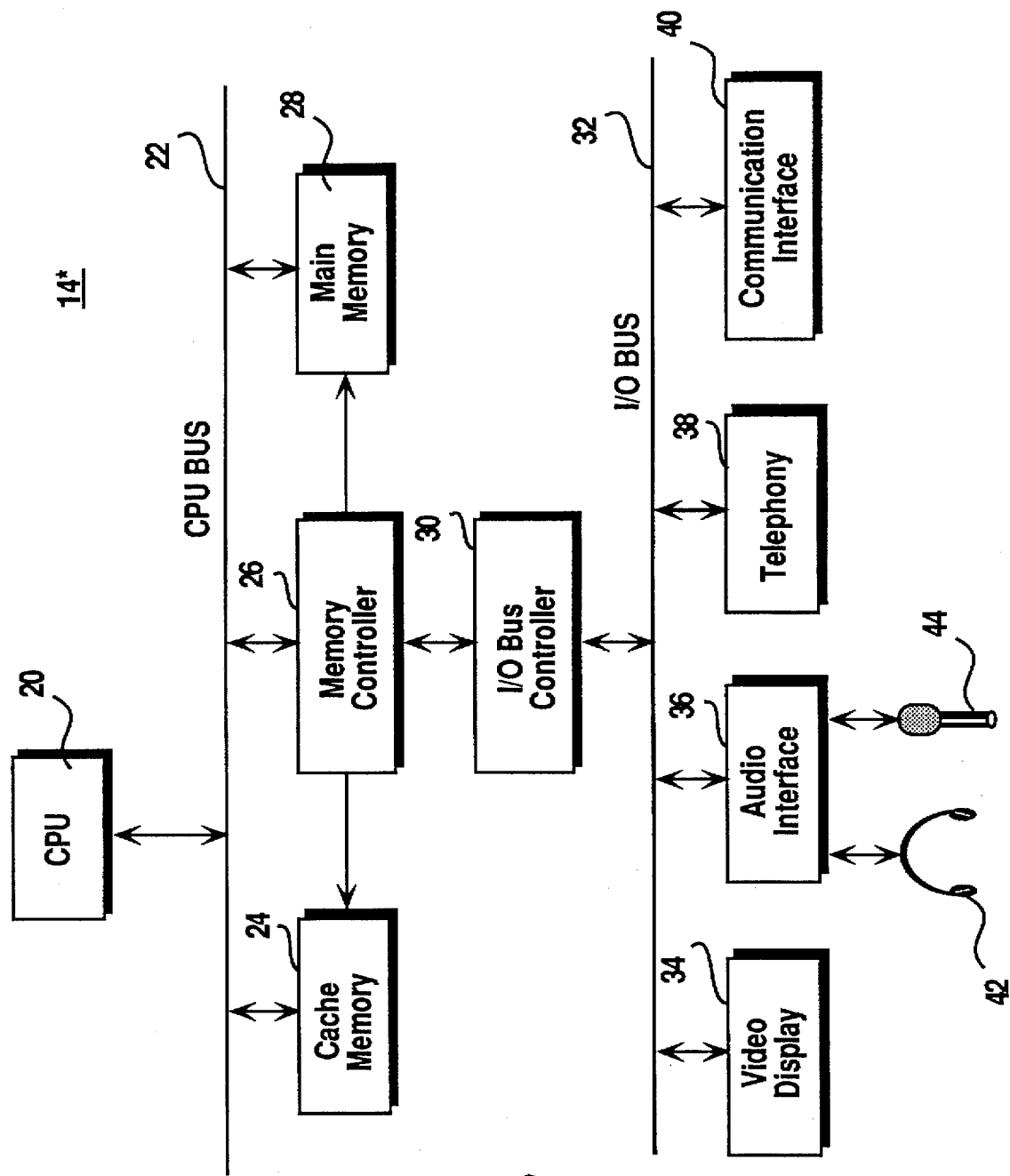
FIG. 3 illustrates one embodiment of the personal conferencing systems of FIGS. 1 & 2.

FIG. 3 illustrates one embodiment of a PCS 14a–14i and 14x–14z (collectively represented by 14* in FIG. 3). PCS 14* includes CPU 20, cache memory 24, main memory 28, memory controller 26, and processor bus 22 coupled to each other as shown. PCS 14* further includes I/O bus controller 30, video display 34, audio interface 36, telephony 38, communication interface 40 and I/O bus 32 coupled to each other as shown. The I/O and memory controllers 30 and 26 are also coupled to each other, whereas audio interface 36 also has headset 42 and microphone 44 coupled to it.

Figure 4:
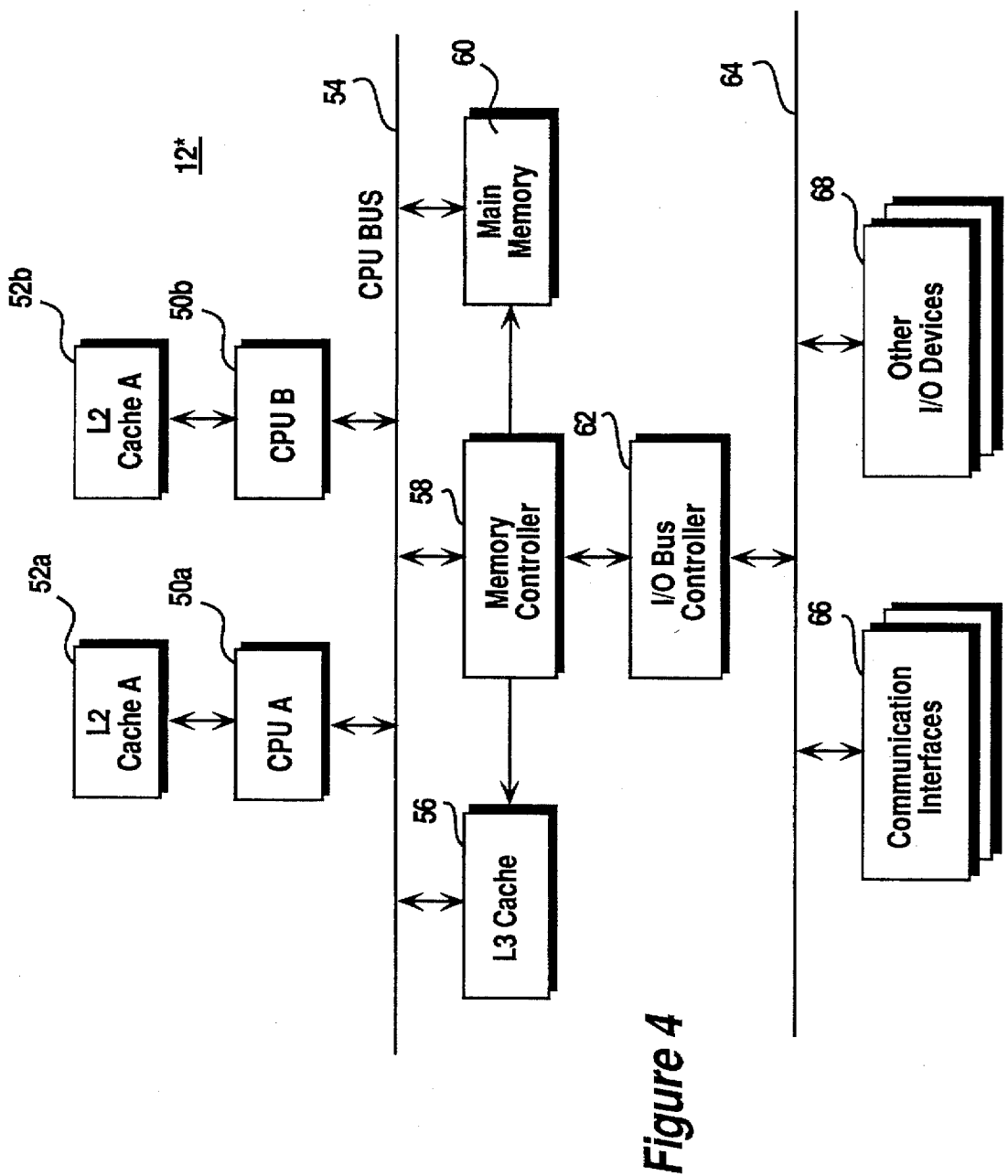
FIG. 4 illustrates one embodiment of the multi-point control units of FIGS. 1 & 2.

FIG. 4 illustrates one embodiment of a MCU 12a–12i and 12x–12y (collectively represented by 12* in FIG. 4). MCU 12i is similarly constituted as PCS 14*, except MCU 12i includes multiple CPUs 50a–50b, and multiple levels of cache memory 52a–52b and 56 for improved performance. Additionally, MCU 12i typically does not include headset 42 and microphone 44.

Except for the manner the elements in FIGS. 3 & 4 are used, they are intended to represent a broad category of similar elements found in many computer systems whose constitutions and functions are well known and will not be otherwise further described. The manner these elements are used under the present invention will be described in detail below with additional references to the remaining figures.

Figure 5:
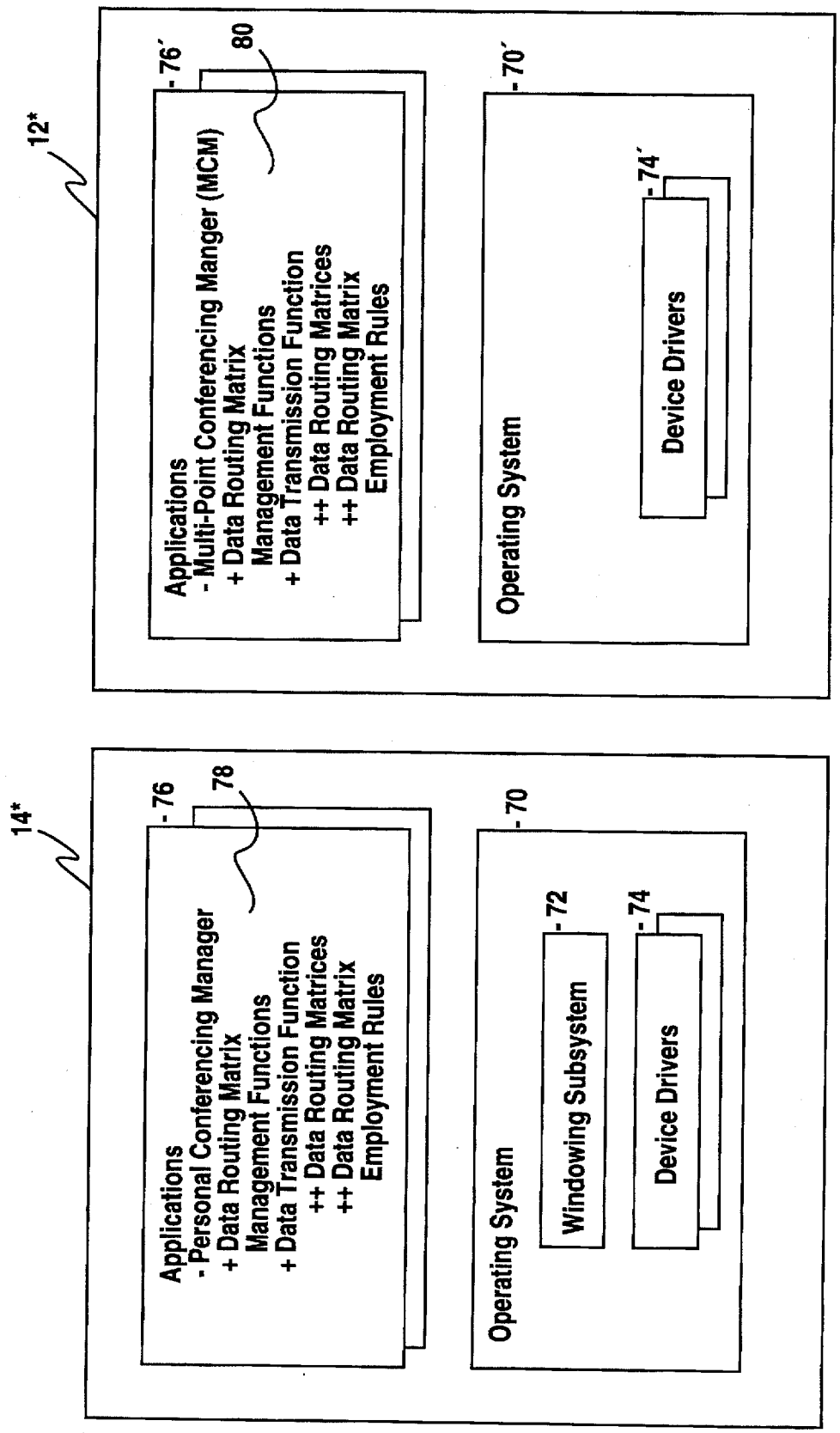
FIG. 5 illustrates the key software components of the personal conferencing systems and the multi-point control units of FIGS. 1 & 2.

FIG. 5 illustrates the key software elements of exemplary PCS 14* and MCU 12*. As shown, PCS 14* and MCU 12* include operating system 70 and 70' having device drivers 74 and 74' respectively. Preferably, operating system 70 further includes windowing subsystem 72. Any number of operating systems well known in the art may be used for operating systems 70 and 70'. PCS 14* and MCU 12' further include applications 76 and 76' respectively. Application 76 includes personal conferencing manager (PCM) 78 having data routing matrix management functions and data transmission function, whereas application 76' includes multi-point conferencing manager (MCM) 80 having complementary data routing matrix management functions and data transmission function, which will be described in more detail below. As will be described also in more detail below, the various data routing matrix management functions and data transmission functions create data routing matrices and data routing matrix employment rules, and employ them to transmit data among the conference participants, thereby allowing a conference to be viewed simply as a collection of these data routing matrices, as well as data routing to be specified in a transport network independent manner and dynamically altered at runtime with very low switching latency. Thus, side conversations and subgroup discussions may be conducted in a more friendly and efficient manner.

FIGS. 6–7 illustrate one embodiment of the data routing matrix management functions and data transmission functions of PCM 78 and MCM 80. Data routing matrix management functions of PCM 78 include a PCM_CREATE, a PCM_UPDATE, a PCM_DELETE, a PCM_ENROLL, and a PCM_CANCEL function 102–110, whereas data transmission function of PCM 78 includes a PCM_SEND function 112. Complementary data routing matrix management functions of MCM 80 include a MCM_ENROLL and a MCM_CANCEL function 114–116, whereas complementary data transmission function of MCM 80 includes a MCM_SEND function 120. Preferably, complementary data routing matrix functions of MCM 80 further include a MCM_GET function 118.

PCM_CREATE, PCM_UPDATE, and PCM_DELETE functions 102–106 are used by the conference participant of the particular PCS 14* to create, update and delete data routing matrices specifying a plurality of data routing patterns for the PCSs. In other words, a conference may be advantageously viewed as a collection of these data routing matrices. Furthermore, data routing among the PCSs may be specified in a transport network independent manner, i.e. regardless whether the underlying transport network uses point-to-point connections, as is used for ITU H.320 compliant ISDN video conferencing, or if the underlying transport network supports multi-casting, such as IP Multicast. Preferably, PCM_UPDATE 103 includes automatically retrieving a copy of a data routing matrix from MCU 12* for update. (The reason for such preference will be obvious from the descriptions to follow.)

PCM_CREATE, PCM_UPDATE, and PCM_DELETE functions 102–106 are also used by the conference participant of the particular PCS 14* to create, update and delete data routing matrix employment rules specifying the conditions governing the runtime employment of the data routing matrices. In other words, data routing may be dynamically altered during runtime in an efficient manner with very low switching latency. Preferably, PCM_UPDATE 103 also includes automatically retrieving a copy of a data routing matrix employment rule from MCU 12* for update. (The reason for such preference will also be obvious from the descriptions to follow.)

As will be obvious from the descriptions to follow, the implementation of these functions 102–106 are well within the ability of those skilled in the art, thus will not be further described.

Figure 8:
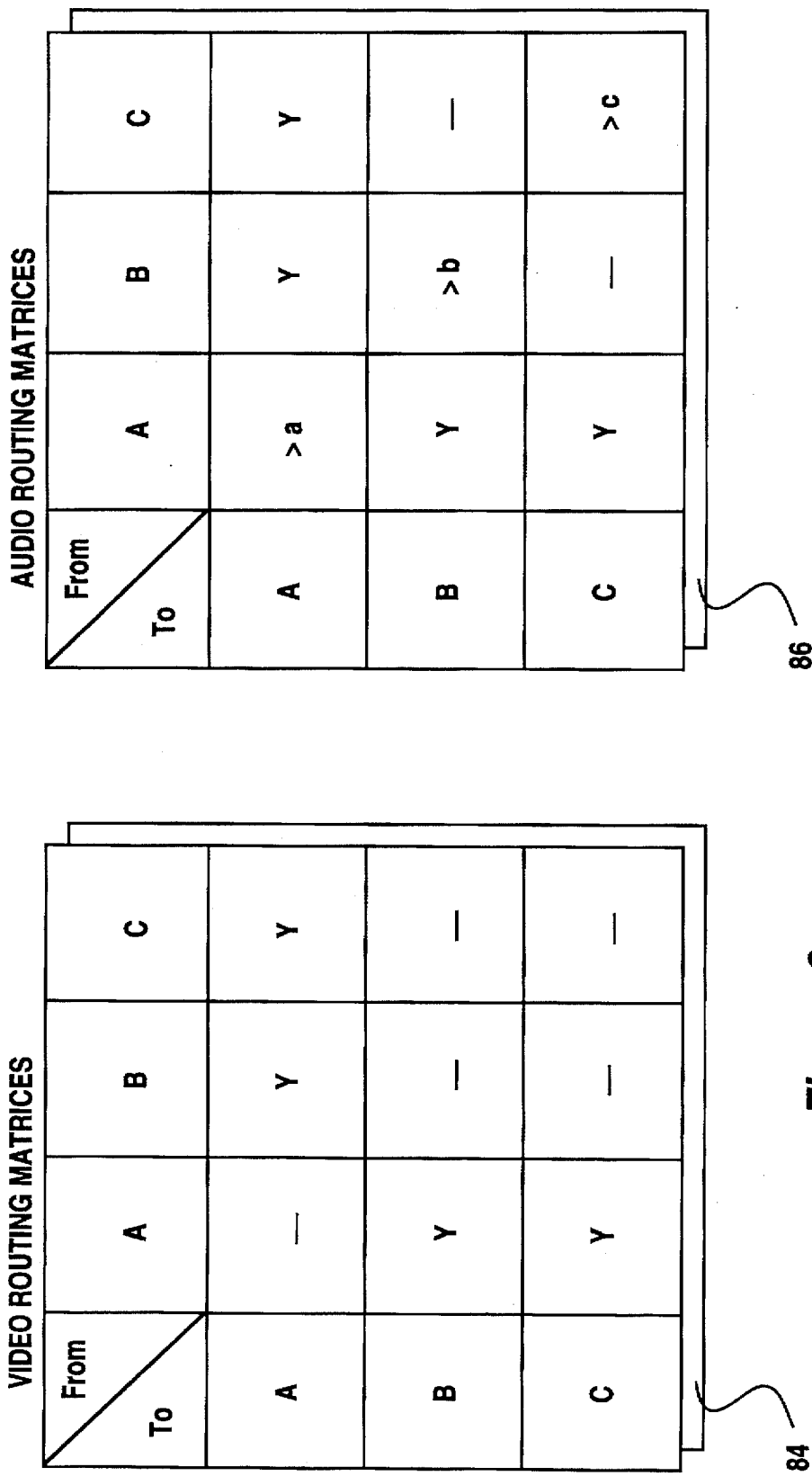
FIGS. 8 & 9 illustrate one embodiment of the data routing matrices and the data routing matrices employment rules of FIG. 5.

Skipping now to FIG. 8, wherein couple of embodiments of data routing matrices, i.e. video routing matrices 84 and audio routing matrices 86 are illustrated. While for ease of explanation, the present invention is being illustrated with video and audio routing matrices, based on the descriptions to follow, it will be appreciated that the present invention may be practiced with other types of data routing matrices, including numeric data routing matrices, character data routing matrices, file routing matrices etc.

As shown, each A/V routing matrix 86 or 84 comprises a plurality of pair-wise A/V routing specifications, with each specification specifying whether A/V data are routed from one conference participant to another. For examples, conference participant A's A/V signals are routed to conference participants B and C, whereas conference participants B & C's A/V signals are routed to conference participant A only.

A specification may specify conditional routing. For example, conference participants A, B & C's audio signals are sent if the signal levels exceed threshold values "a", "b" and "c" respectively.

Thus, a conference participant may create one or more A/V routing matrices that specify routing to selective conference participants only to facilitate side conversations or subgroup discussions from time to time. For examples, conference participant A may have an additional A/V routing matrix that routes A/V data to conference participant B only, and another additional A/V routing matrix that routes A/V data to conference participant C only, to facilitate side-conversations with B and C respectively, from time to time.

Figure 9:
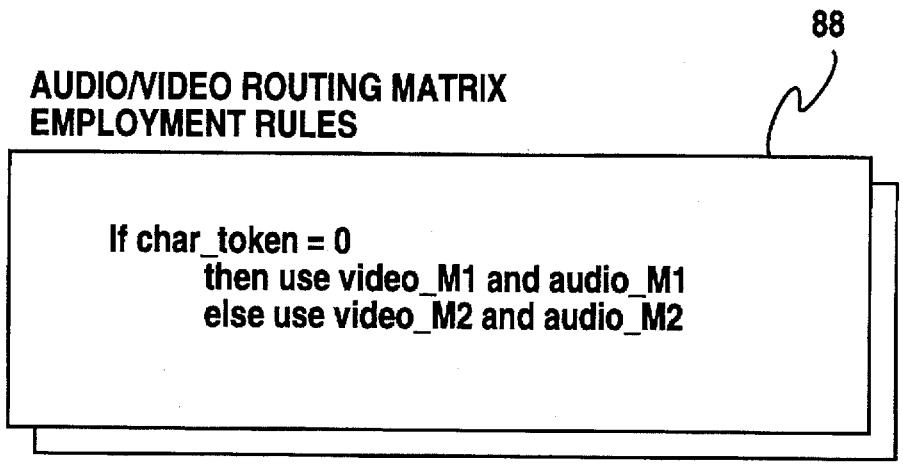
Figure 10:
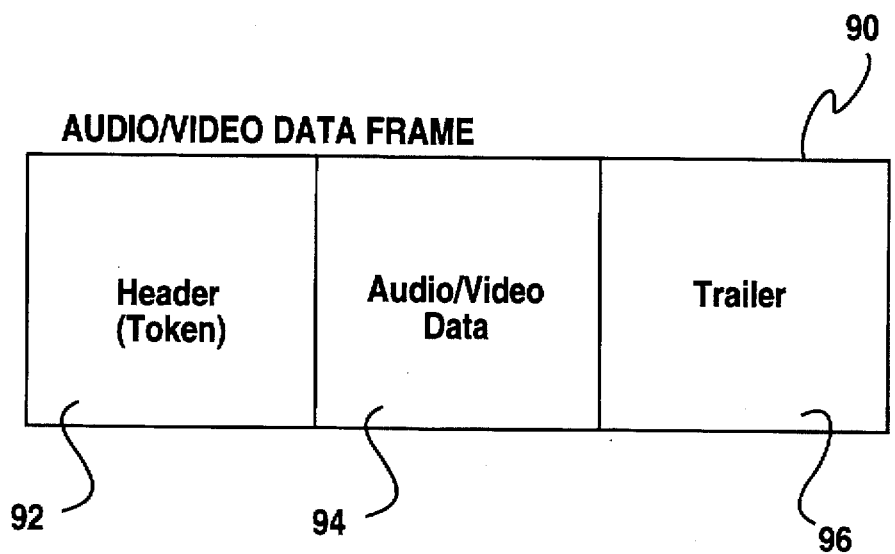
FIG. 10 illustrates one embodiment of a frame of data.

Skipping further now to FIGS. 9–10, wherein one embodiment of the data routing matrix employment rules and a data frame, i.e. an A/V routing matrix rule 88 and an A/V data frame 90 are illustrated. Similarly, while for ease of explanation, the present invention is being illustrated with A/V routing matrix employment rules and A/V data frame, based on the descriptions to follow, it will be appreciated that the present invention may be practiced with other types of data routing matrix employment rules and data frames, including numeric data routing matrix employment rules and numeric data frame, character data routing matrix employment rules and character data frame, files routing matrix employment rules and file data frames etc.

Each A/V routing matrix employment rule 88 comprises one or more conditions governing the employment of the various A/V routing matrices 84 and 86 for routing A/V data. The governing conditions are expressed in terms one or more multi-point references. A multi-point reference is a reference from which recipients may be dynamically inferred. The multi-point references are specified at the time of data transmission. In some embodiments, for A/V data, the multi-point references are specified in each A/V data frame 90.

In some embodiments, the multi-point references are implemented using character tokens. Therefore, the governing conditions of the data routing matrix employment rules are expressed in terms of character tokens, and the character tokens are included as part of the header 92 of a data frame 90.

Referring now back to FIGS. 6–7, the PCM_ENROLL, PCM_CANCEL, MCM_ENROLL and MCM_CANCEL functions 108–110 and 114–116 are used to enroll and cancel the PCS' created data routing matrices 84 and 86 and data routing matrices employment rules 88, such as the A/V routing matrices and their associated employment rules described earlier, with MCM 80 of the interconnected MCU 12*. PCM_ENROLL 108 provides the desired data routing matrices 84 and 86 and/or data routing matrix employment rules 88 to be enrolled with MCM 80 responsive to user inputs. MCM_ENROLL 114 logs the enrollments accordingly. Conversely, PCM_CANCEL 110 informs MCM 80 of the desired data routing matrices 84 and 86 and/or data routing matrix employment rules 88 to be canceled responsive also to user inputs. MCM_CANCEL 116 deletes the enrollments accordingly. Additionally, MCM_GET 118 is used to support automatic retrieval of a copy of a data routing matrix 84 or 86 or a data routing matrix employment rule by PCM_UPDATE 104 of PCS 14*. The implementation of these functions 108–110 and 114–118 are also well within the ability of those skilled in the art, thus will not be further described.

Continuing to refer to FIGS. 6–7, PCM_SEND and MCM_SEND 112 and 130 are used to send data, including A/V data described earlier. PCM_SEND 112 sends data from a PCS 14* to the interconnected MCU 12* specifying the destination(s) in terms of a multi-point reference, as described earlier. In response, MCM_SEND 120 determines which enrolled data routing matrix 84 and 86 should govern the routing, applying the enrolled data routing matrix employment rules 88, based on the specified multi-point reference.

Thus, by enrolling data routing matrices 84 and 86 desired, a conference participant of a PCS 14* may initiate and engage in side conversations or subgroup discussions with selected subgroups of conference participants in other PCSs 14*, without having to particularize the recipients of each data transmission, one at a time. In like manner, by canceling data routing matrices 84 and 86 no longer desired, a conference participant of a PCS 14* may disengage from these side conversations or subgroup discussions.

Thus, a method and apparatus for heterogeneous multimedia conferencing using multi-point references has been described. While the method and apparatus of the present invention has been described in terms of the above illustrated embodiments, those skilled in the art will recognize that the invention is not limited to the embodiments described. The present invention can be practiced with modification and alteration within the spirit and scope of the appended claims. The description is thus to be regarded as illustrative instead of restrictive on the present invention.

What is claimed is:

1. A personal conferencing system (PCS) comprising a personal conference manager (PCM) having a first function to send data to other PCSs in conference with the PCS through a multi-point control unit (MCU), wherein the first function sends data and multi-point references specified for the data to the MCU, wherein the MCU is directed to use the multi-point references to select data routing matrices from enrolled data routing matrices, wherein the MCU is operative to perform evaluations and apply results of the evaluations to determine which data routing matrix among the enrolled data routing matrices is an appropriate one to select using said multi-point references, and ascertain destinations of the data being sent using the selected data routing matrix, wherein the MCU send the data to the ascertained destinations accordingly, and wherein each data routing matrix specifies a particular data routing pattern among the PCSs.

2. The PCS as set forth in claim 1, wherein the PCM further includes a second function for enrolling the data routing matrices with the MCU.

3. The PCS as set forth in claim 2, wherein the PCM further includes a third function for canceling enrollment of one or more of the enrolled data routing matrices with the MCU.

4. The PCS as set forth in claim 2, wherein the PCM further includes a third function for creating a data routing matrix.

5. The PCS as set forth in claim 4, wherein the PCM further includes a fourth function for deleting a created data routing matrix.

6. The PCS as set forth in claim 4, wherein the PCM further includes a fourth function for updating a created data routing matrix.

7. The PCS as set forth in claim 6, wherein the fourth function includes logic for retrieving an enrolled data routing matrix from the MCU for update.

8. The PCS as set forth in claim 1, wherein the MCU is to perform evaluation of enrolled data routing matrix employment rules, and then apply the employment rule evaluation results in making the data routing matrix selection, wherein the data routing matrix employment rules comprise conditions expressed in terms of multi-point references governing employment of the enrolled data muting matrices.

9. The PCS as set forth in claim 8, wherein the PCM further includes a second function for enrolling the data routing matrix employment rules with the MCU.

10. The PCS as set forth in claim 9, wherein the PCM further includes a third function for canceling enrollment of one or more of the enrolled data routing matrix employment rules with the MCU.

11. The PCS as set forth in claim 9, wherein the PCM further includes a third function for creating a data routing matrix employment rule.

12. The PCS as set forth in claim 11, wherein the PCM further includes a fourth function for deleting a created data routing matrix employment rule.

13. The PCS as set forth in claim 11, wherein the PCM further includes a fourth function for updating a created data routing matrix employment rule.

14. The PCS as set forth in claim 13, wherein the fourth function includes logic for retrieving an enrolled data routing matrix employment rule from the MCU for update.

15. The PCS as set forth in claim 8, wherein the multi-point references are implemented using character tokens, and the conditions governing employment of the data routing matrices are expressed in terms of the character tokens.

16. A multi-point control unit (MCU) comprising a multi-point control manager (MCM) having a first function for sending data to interconnected personal conferencing systems (PCSs) in conference with each other using multi-point references specified by the interconnected PCS for the data being sent, wherein the first function uses the multi-point reference specified for each data transmission to select a data routing matrix from one or more enrolled data routing matrices, wherein the MCU is opeative to perform evaluations and apply results of the evaluations to determine which data routing matrix among the enrolled data routing matrices is an appropriate one to select using said multi-point references, and ascertain destinations of the data being sent using the selected data routing matrix, and send the data to the ascertained destinations accordingly, and wherein each data routing matrix specifies a particular data routing pattern among the PCSs.

17. The MCU as set forth in claim 16, wherein the MCM further includes a second function for enrolling the data routing matrices with the MCU.

18. The MCU as set forth in claim 17, wherein the MCM further includes a third function for canceling enrollment of one or more of the enrolled data routing matrices with the MCU.

19. The MCU as set forth in claim 16, wherein the first function is to perform evaluations of one or more enrolled data routing matrix employment rules for each data transmission, and apply the employment rule evaluation results in making the data routing matrix selection, wherein the data routing matrix employment rules comprise conditions expressed in terms of multi-point references governing employment of the enrolled data routing matrices.

20. The MCU as set forth in claim 19, wherein the MCM further includes a second function for enrolling the data routing matrix employment rules with the MCU.

21. The MCU as set forth in claim 20, wherein the MCM further includes a third function for canceling enrollment of one or more of the enrolled data routing matrix employment rules with the MCU.

22. The MCU as set forth in claim 16, wherein the multi-point references are implemented using character tokens, and the conditions governing employment of the data routing matrices are expressed in terms of the character tokens.

23. A multi-point conference system comprising:

a) a multi-point control unit (MCU) having a multi-point control manager (MCM) including a first function for sending data to interconnected personal conferencing systems (PCSs) in conference with each other using multi-point references specified by the interconnected PCS for the data being sent, wherein the first function uses the multi-point reference specified for each data transmission to select a data routing matrix from one or more enrolled data routing matrices, wherein the MCU is operative to perform evaluations and apply results of the evaluations to determine which data routing matrix among the enrolled data routing matrices is an appropriate one to select using said multi-point references, and ascertain destinations of the data being sent using the selected data routing matrix, and send the data to the ascertained destinations accordingly, and wherein each data routing matrix specifies a particular data routing pattern among the PCSs; and b) a first and a second personal conferencing system (PCS), each having a personal conference manager (PCM) including a second function for sending data to each other as well as other PCS s in conference with the first and second PCSs through the MCU using the multi-point references.

24. The multi-point conference system as set forth in claim 23, wherein the MCM further includes a third function for enrolling the data routing matrices with the MCU.

25. The multi-point conference system as set forth in claim 23, wherein the first function is to perform evaluations of one or more enrolled data routing matrix employment rules for each data transmission, and apply the employment rule evaluation results in making the data routing matrix selection, wherein the data routing matrix employment rules comprise conditions expressed in terms of multi-point references governing employment of the enrolled data routing matrices.

26. The multi-point conference system as set forth in claim 25, wherein the MCM further includes a third function for enrolling the data routing matrix employment rules with the MCU.

27. The multi-point conference system as set forth in claim 23, wherein each of the PCMs further includes a third function for enrolling the data routing matrices with the MCU.

* * * * *